UNITED STATES PATENT OFFICE.

BERNARD OVERLACK, OF PALATKA, FLORIDA.

WATER-PROOF COMPOSITION FOR ROOFING, &c.

SPECIFICATION forming part of Letters Patent No. 354,611, dated December 21, 1886.

Application filed August 6, 1886. Serial No. 210,207. (No specimens.)

*To all whom it may concern:*

Be it known that I, BERNARD OVERLACK, a citizen of the United States, residing at Palatka, in the county of Putnam and State of Florida, have invented a new and useful Water-Proof and Non-Conductive Composition of Matter, to be used wherever it is necessary to render articles water-proof and impenetrable to heat and cold, rust, rot, and decay, of which the following is a specification.

My composition consists of the following ingredients, combined in the proportions stated, viz: white sharp sand, three hundred and fifty parts; rosin, sixty parts; slaked lime, forty parts; boiled linseed-oil, four parts. After the above composition has been thoroughly mixed and boiled in an iron tank one part of sulphuric acid and one part of suboxide of copper are added. The composition thus obtained makes a thoroughly water-proof roofing material, which to a certain extent is also fire-proof, as it cannot be ignited by sparks, it requiring a temperature of at least 280° Fahrenheit to melt the material. The same is always applied in a hot liquid form.

In cisterns, tanks, or water-reservoirs the composition takes the place of cement or metal lining, being superior to them on account of its expanding and contracting qualities.

If cut and mixed with boiled linseed-oil, the material can be applied in form of paint to iron and wood, thus rendering the same impenetrable to water.

When railroad-ties, bridge-piles, the hulls of vessels, and the like are coated with the composition, the same are rendered proof against rot and decay.

Ships and boats the hulls of which are coated with my composition do not need any calking, the composition making the seams perfectly water-tight and contracting and expanding with the vessel's timbers; and if arsenic is added to the composition, a material is obtained which barnacles will not touch or adhere to.

In buildings where it is desirable or necessary to prevent the dampness contained in the ground from ascending up in the walls, a layer of my composition placed in the walls just above the ground will achieve the desired result, thus taking the place of a layer of more expensive stone, slate, or cement.

For the manufacture of artificial ornaments, such as may be used to take the place of stone or iron in fronts of buildings or the like my composition furnishes an excellent material, as it can be treated and cast in any shape desired in the same manner as cast-iron.

The composition applied in a liquid hot state to a wooden street-pavement unites the wooden blocks firmly together, rendering the pavement impenetrable to water, and the material expanding and contracting with the pavement, no cracks will appear in the pavement whatever changes may occur in the atmospheric temperature.

Sidewalks, driveways, and the like formed with the composition stand wear and tear and the weather better than if made of stone or any other material. Wherever the material is applied it will stick to and unite with, its cohesive qualities being superior to those of the best glue.

The non-conductive qualities of the composition render the same valuable wherever heat or cold is to be shut out, as in refrigerators, coolers, and the like.

Having thus described my composition and some of its advantages, what I claim, and desire to secure by Letters Patent, is—

The herein-described water-proof and non-conductive composition of matter, consisting of white sharp sand, rosin, slaked lime, boiled linseed-oil, sulphuric acid, and suboxide of copper, in the proportions specified.

In testimony whereof I have signed my name to this specification in the presence of two subscribing witnesses.

BERNARD OVERLACK.

Witnesses:
CHAS. S. B. CHANT,
H. A. HEATH.